United States Patent
Samuel et al.

(10) Patent No.: US 11,748,228 B2
(45) Date of Patent: Sep. 5, 2023

(54) OPTIMIZING PREBOOT TELEMETRY EFFICIENCY

(71) Applicant: Dell Products L.P., Round Rock, TX (US)

(72) Inventors: Balasingh P. Samuel, Round Rock, TX (US); Sungsup Lee, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 268 days.

(21) Appl. No.: 17/185,701

(22) Filed: Feb. 25, 2021

(65) Prior Publication Data

US 2022/0269543 A1  Aug. 25, 2022

(51) Int. Cl.
*G06F 11/34*  (2006.01)
*G06F 9/50*  (2006.01)
*G06F 9/4401*  (2018.01)
*G06F 11/30*  (2006.01)

(52) U.S. Cl.
CPC ........ *G06F 11/3433* (2013.01); *G06F 9/4401* (2013.01); *G06F 9/5016* (2013.01); *G06F 11/3051* (2013.01); *G06F 2209/5019* (2013.01)

(58) Field of Classification Search
CPC .. G06F 9/5016; G06F 9/4401; G06F 11/3051; G06F 11/3433
See application file for complete search history.

(56) References Cited

U.S. PATENT DOCUMENTS

| | | | | |
|---|---|---|---|---|
| 6,865,669 | B1* | 3/2005 | Mahmoud | G06F 9/4401 713/1 |
| 7,552,319 | B2* | 6/2009 | Matheny | G06F 9/342 713/1 |
| 7,809,918 | B1* | 10/2010 | Samuel | G06F 12/023 711/171 |
| 10,996,876 | B2* | 5/2021 | Prasad | G06F 3/0619 |
| 11,347,664 | B1* | 5/2022 | Samuel | G06F 3/068 |
| 11,650,887 | B2* | 5/2023 | Samuel | G06F 11/1464 714/19 |
| 2006/0004975 | A1* | 1/2006 | Matheny | G06F 9/342 711/202 |
| 2008/0059781 | A1* | 3/2008 | Li | G06F 9/44557 713/1 |
| 2009/0249052 | A1* | 10/2009 | Sareen | G06F 12/0246 711/202 |
| 2017/0262388 | A1* | 9/2017 | Lin | G06F 9/4411 |
| 2018/0293061 | A1* | 10/2018 | Arms | G06F 8/654 |
| 2020/0192572 | A1* | 6/2020 | Dwarampudi | G06F 3/064 |
| 2020/0225994 | A1* | 7/2020 | Rajagopal | G06F 12/1009 |

* cited by examiner

*Primary Examiner* — Benjamin C Wu
(74) *Attorney, Agent, or Firm* — Jackson Walker L.L.P

(57) ABSTRACT

An information handling system may include a processor and a basic input/output system configured to identify, test, and/or initialize information handling resources of the information handling system, and further configured to predict a volume of incoming telemetry data collected by a preboot driver of the basic input/output system and based on the volume predicted, manage storage of the telemetry data among memory associated with the basic input/output system.

12 Claims, 4 Drawing Sheets

OPTIMIZING PREBOOT TELEMETRY EFFICIENCY

TECHNICAL FIELD

The present disclosure relates in general to information handling systems, and more specifically to systems and methods for optimizing preboot telemetry efficiency in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many manufacturers of information handling systems provision information handling systems with pre-boot telemetry agents configured to collect telemetry data and communicate such telemetry data to an operating system executing on the information handling system, wherein such information may be used for debugging, problem solving, and/or other analysis. Such telemetry agents may capture, store, and format firmware level (e.g., basic input/output system (BIOS), enclosure controller, management engine) telemetry data. Such telemetry data may be logged during a pre-boot state of the information handling system and during steady-state operation of the information handling system. Some of the data may be stored in persistent memory (e.g., non-volatile random access memory (NVRAM)) so that data is persistent between boot sessions. During the end of each boot, BIOS may format and organize data (e.g., into a table of JavaScript Object Notation entries) which may be made available to the operating system via an appropriate interface (e.g., Windows Management Interface). Through the interface, an operating system agent may consume the telemetry data and may signal the preboot telemetry agent to delete or otherwise clear out consumed data. Such data as consumed by the operating system agent may be used for multiple purposes to assist an end user, administrator, or manufacturer of the information handling system to improve operation of the information handling system.

However, there is a possibility that the operating system agent may not be present. For example, an end user may reimage the information handling system or otherwise delete the operating system agent. Accordingly, traditional implementations of preboot telemetry agents may have disadvantages when no operating system agent is available to consume telemetry data.

To illustrate, there may be a fixed allocation of NVRAM space for a preboot telemetry agent to store telemetry data, Further, the preboot telemetry agent may have no way of knowing whether the operating system agent has been deleted from the information handling system. In turn, when no operating system agent is present to consume and clear out data in NVRAM, the allocated NVRAM space may fill up over time. If insufficient space is present in NVRAM, the preboot telemetry agent may discard additional telemetry data that would otherwise be stored in NVRAM. Consequently, critical telemetry data may be lost, while less-than-critical data may populate the NVRAM.

Even without the presence of the operating system agent, telemetry data stored in NVRAM may help diagnose system failures by providing a history of BIOS configuration changes, thermal changes, BIOS update results, diagnostics history, system health status, and more. However, this ability may become less effective in the case the NVRAM is populated with older data while new data is discarded.

Further, during each boot, the preboot telemetry agent may continue to process and attempt to present telemetry data to the operating system, which may unnecessarily increase boot time.

SUMMARY

In accordance with the teachings of the present disclosure, the disadvantages and problems associated with existing approaches of preboot telemetry agents in an information handling system may be reduced or eliminated.

In accordance with embodiments of the present disclosure, an information handling system may include a processor and a basic input/output system configured to identify, test, and/or initialize information handling resources of the information handling system, and further configured to predict a volume of incoming telemetry data collected by a preboot driver of the basic input/output system and based on the volume predicted, manage storage of the telemetry data among memory associated with the basic input/output system.

In accordance with these and other embodiments of the present disclosure, a method comprising, in a basic input/output system configured to identify, test, and/or initialize information handling resources of the information handling system, predicting a volume of incoming telemetry data collected by a preboot driver of the basic input/output system and based on the volume predicted, managing storage of the telemetry data among memory associated with the basic input/output system.

In accordance with these and other embodiments of the present disclosure, an article of manufacture may include a non-transitory computer-readable medium and computer-executable instructions carried on the computer-readable medium, the instructions readable by a processing device, the instructions, when read and executed, for causing the processing device to, in a basic input/output system configured to identify, test, and/or initialize information handling resources of an information handling system: predict a volume of incoming telemetry data collected by a preboot driver of the basic input/output system and based on the volume predicted, manage storage of the telemetry data among memory associated with the basic input/output system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
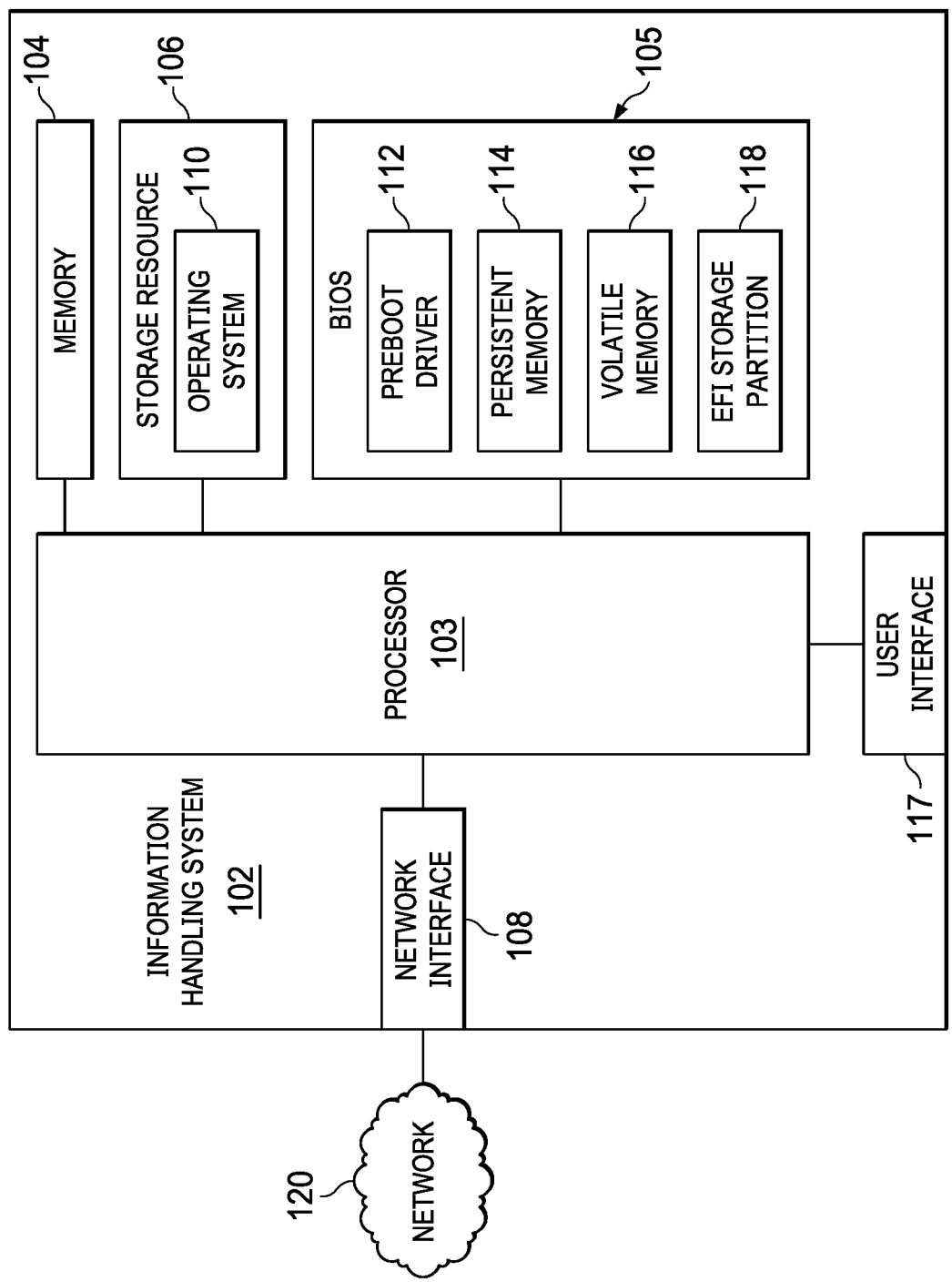
FIG. 1 illustrates a block diagram of selected components of an example information handling system, in accordance with embodiments of the present disclosure.

FIG. 1 illustrates a block diagram of selected components of an example information handling system 102, in accordance with embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, a basic input/output system (BIOS) 105 communicatively coupled to processor 103, a storage resource 106 communicatively coupled to processor 103, a network interface 108 communicatively coupled to processor 103, and a user interface 117 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, BIOS 105, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disc drive, a solid state storage drive, a flash drive and/or any other suitable computer-readable medium. In some embodiments, storage resource 106 may reside internal to a chassis or other enclosure comprising information handling system 102 and not be readily accessible without opening such chassis or other enclosure. In other embodiments, storage resource 106 may reside external to a chassis or other enclosure comprising information handling system 102. As shown in FIG. 1, storage resource 106 may have stored thereon an operating system (OS) 110.

Operating system 110 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by OS 110. Active portions of OS 110 may be transferred from storage resource 106 to memory 104 for execution by processor 103. In some embodiments, operating system 110 may include or otherwise implement an operating system telemetry agent configured to consume telemetry data stored within persistent memory 114 of BIOS 105.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 105 may include a preboot driver 112, a persistent memory 114, a volatile memory 116, and an Extensible Firmware Interface (EFI) storage partition 118. As described in greater detail below with reference to FIGS. 2 through 4, preboot driver 112 may comprise preboot firmware configured to collect telemetry data associated with information handling system 102 and to manage storage and organization of such telemetry data.

Persistent memory 114 may comprise any suitable memory (e.g., NVRAM) for persistently storing data such that the stored data is maintained between boot cycles, such that it is not erased or lost due to power-cycling of information handling system 102, but instead may be erased in response to suitable commands (e.g., from preboot driver 112) to erase such data.

Volatile memory 116 may comprise any suitable memory (e.g., random access memory (RAM))) that may store data, but not necessarily maintain the stored data between boot cycles, as such data may be lost when a source of electrical energy is withdrawn from volatile memory 116.

EFI storage partition 118 may comprise storage media formatted in accordance with an appropriate EFI standard and may include persistent storage capable of maintaining stored data between boot cycles, but having slower data access performance than persistent memory 114.

Network interface 108 may comprise any suitable system, apparatus, or device operable to serve as an interface between information handling system 102 and a network 120 comprising one or more other information handling systems. Network interface 108 may enable information handling system 102 to communicate over such network 120 using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or as part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC."

User interface 117 may comprise any instrumentality or aggregation of instrumentalities by which a user may interact with information handling system 102. For example, user interface 117 may permit a user to input data and/or instructions into information handling system 102 (e.g., via a keyboard, pointing device, and/or other suitable component), and/or otherwise manipulate information handling system 102 and its associated components. User interface 117 may also permit information handling system 102 to communicate data to a user, e.g., by way of a display device.

Figure 2:
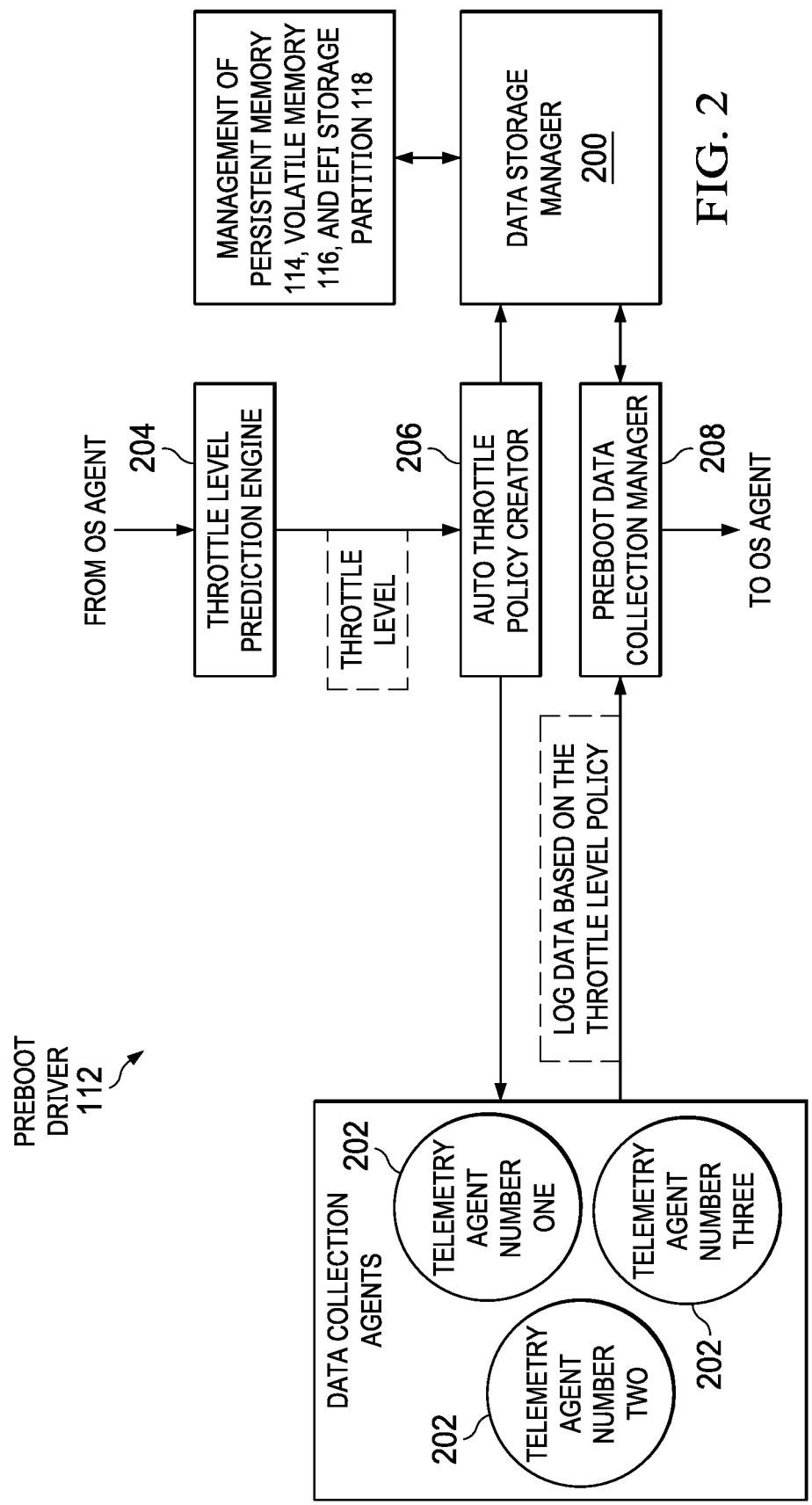
FIG. 2 illustrates a block diagram of selected components of an example BIOS driver, in accordance with embodiments of the present disclosure.

FIG. 2 illustrates a block diagram of selected components of an example preboot driver 112, in accordance with embodiments of the present disclosure. In operation, preboot driver 112 may collect several data points from a preboot phase of information handling system 102 as well as during steady-state operation of information handling system 102. Based on one or more factors (e.g., whether an operating system telemetry agent 202 executes on OS 110, data criticality of data, etc.), preboot driver 112 may intelligently manage the data records to determine whether to store telemetry data collected by telemetry agents 202 to persistent memory 114 or volatile memory 116.

Figure 3:
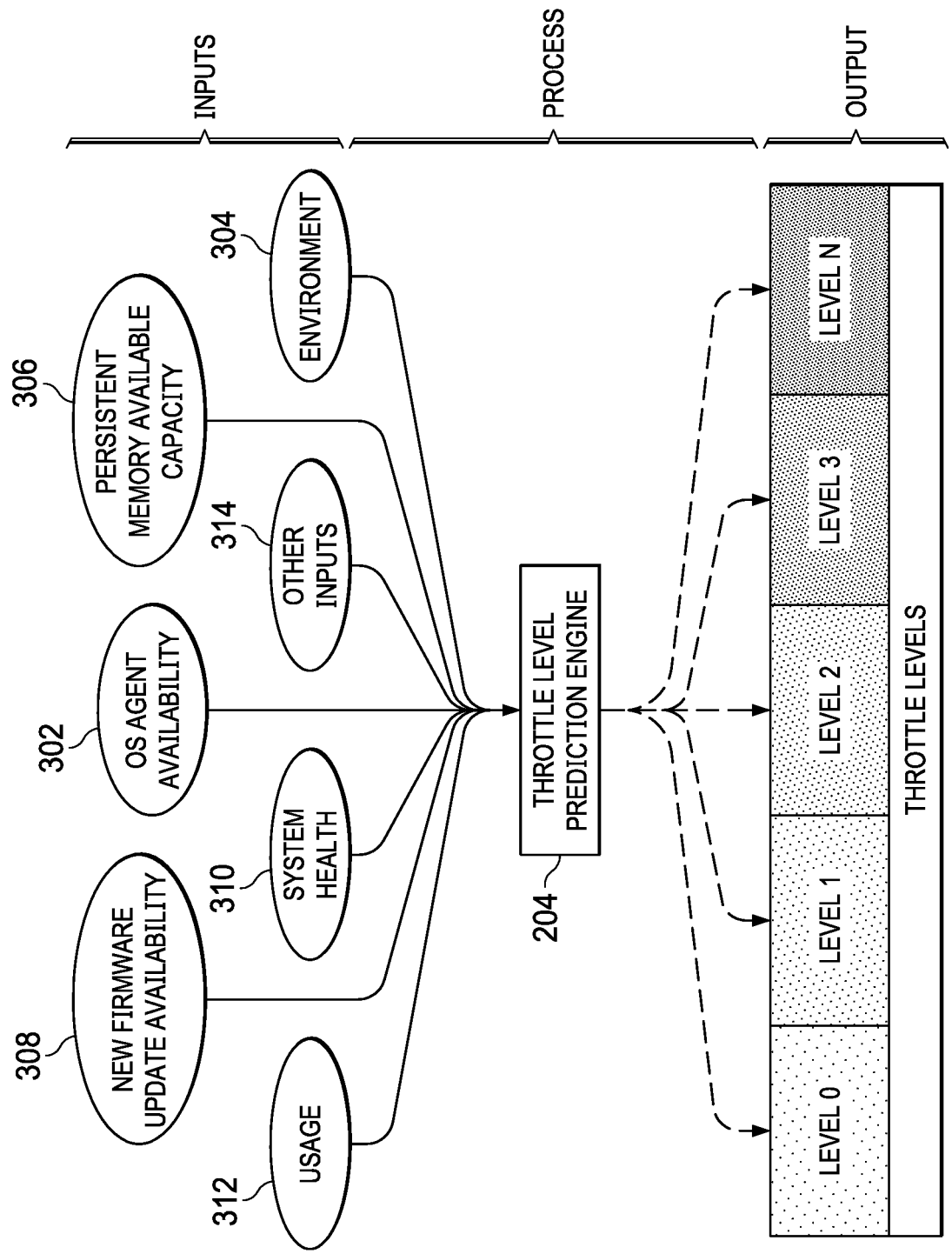
FIG. 3 illustrates a flow diagram detailing functionality of a throttle level prediction engine, in accordance with embodiments of the present disclosure.

As shown in FIG. 2, preboot driver 112 may include a throttle level prediction engine 204. Throttle level prediction engine 204 may receive information from the operating system telemetry agent 202 executing on OS 110 indicating a rate of consumption of telemetry data by the operating system telemetry agent 202 (e.g., based on telemetry data requests from the operating system telemetry agent 202). As a specific example, if an indication is received by throttle level prediction engine 204 that no telemetry data requests are made by the operating system telemetry agent 202, then throttle level prediction engine 204 may determine that the telemetry agent 202 is not present. In addition, as shown in FIG. 3, throttle level prediction engine 204 may receive other parameters regarding operation of information handling system 102 and preboot driver 112, including without limitation availability of operating system telemetry agent 302, environmental information 304, availability capacity 306 of persistent memory 114, new firmware update availability 308 for BIOS 105, system health parameters 310 for information handling system 102, usage parameters 312 for information handling system 102, and/or other input information 314. Based on one or more of such parameters, throttle level prediction engine 204 may select a throttle level (e.g., level 0, level 1, level 2, level 3, level N, etc.).

Figure 4:
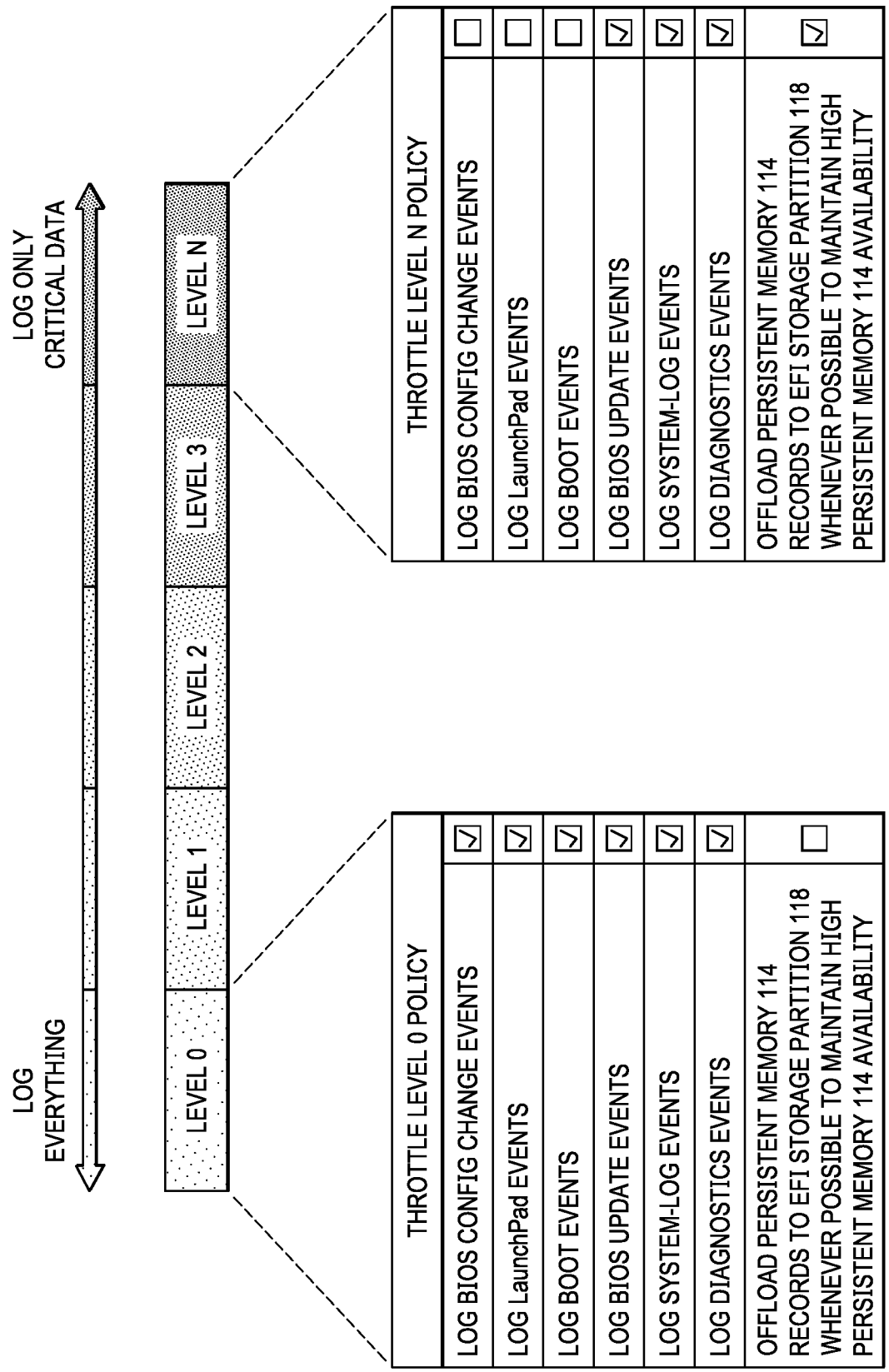
FIG. 4 illustrates selection of a throttle policy, in accordance with embodiments of the present disclosure.

As also shown in FIG. 2, preboot driver 112 may include an automatic throttle policy creator 206. Automatic throttle policy creator 206 may be configured to, based on the throttle level determined by throttle level prediction engine 204, set a throttle policy. For example, as shown in FIG. 4, for lower throttle levels, automatic throttle policy creator 206 may create a throttle policy in which more telemetry data is logged. On the other hand, for higher throttle levels, automatic throttle policy creator 206 may create a throttle policy in which lesser telemetry data is logged (e.g., only telemetry data deemed "critical" is logged), as well as enabling offload of data stored in persistent memory 114 to EFI storage partition 118 in order to maintain higher availability of persistent memory 114.

In some embodiments, automatic throttle policy creator 206 may use a rules-based engine to predict telemetry data required for a period of time into the future, and the throttling policy may be set based on the result predicted by such rules engine. For example, repeated telemetry data related to power events may be reduced if extensive power events are expected for a period of time into the future.

As further shown in FIG. 2, a preboot data collection manager 208 may log data and communicate data to the operating system telemetry agent 202 based on the determined throttle level. For example, preboot data collection manager 208 may log more data and communicate data to the operating system telemetry agent 202 for a throttle policy resulting from lower throttle levels. On the other hand, preboot data collection manager 208 may log lesser data and refrain from attempting to communicate data to the operating system telemetry agent 202 for a throttle policy resulting from higher throttle levels.

As additionally shown in FIG. 2, a data storage manager 210 may manage storage of data to persistent memory 114, volatile memory 116, and EFI storage partition 118 based on the determined throttle level. For example, data storage manager 210 may store more telemetry data in persistent memory 114 in response to a throttle policy resulting from lower throttle levels. On the other hand, data storage manager 210 may store lesser telemetry data (e.g., only data deemed critical or high-priority) in persistent memory 114 in response to a throttle policy resulting from higher throttle levels. Further, for a throttle policy resulting from lower throttle levels, data storage manager 210 may disable offloading of data from persistent memory 114 to EFI storage partition 118. However, for a throttle policy resulting from higher throttle levels, data storage manager 210 may enable offloading of data from persistent memory 114 to EFI storage partition 118, thus maintaining higher availability of persistent memory 114.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor; and
   a basic input/output system configured to identify, test, and/or initialize information handling resources of the information handling system, and further configured to:
   predict a volume of incoming telemetry data collected by a preboot driver of the basic input/output system;
   based on the volume predicted, manage storage of the telemetry data among memory associated with the basic input/output system;
   predict a consumption of the telemetry data by an operating system of the information handling system; and
   selectively enable and disable communication of the telemetry data to the operating system based on the consumption predicted.

2. The information handling system of claim 1, wherein the memory associated with the basic input/output system includes persistent memory, volatile memory, and a storage partition.

3. The information handling system of claim 2, wherein managing storage of the telemetry data among memory associated with the basic input/output system includes managing offload of telemetry data.

4. The information handling system of claim 1, the basic input/output system further configured to:
   determine a consumption of the telemetry data by an operating system of the information handling system; and
   based on the volume predicted and the consumption, manage storage of the telemetry data among the memory associated with the basic input/output system.

5. A method comprising, in a basic input/output system configured to identify, test, and/or initialize information handling resources of the information handling system:
   predicting a volume of incoming telemetry data collected by a preboot driver of the basic input/output system; and
   based on the volume predicted, managing storage of the telemetry data among memory associated with the basic input/output system;
   predicting a consumption of the telemetry data by an operating system of the information handling system; and
   selectively enabling and disabling communication of the telemetry data to the operating system based on the consumption predicted.

6. The method of claim 5, wherein the memory associated with the basic input/output system includes persistent memory, volatile memory, and a storage partition.

7. The method of claim 6, wherein managing storage of the telemetry data among memory associated with the basic input/output system includes managing offload of telemetry data.

8. The method of claim 5, further comprising:
   determining a consumption of the telemetry data by an operating system of the information handling system; and
   based on the volume predicted and the consumption, managing storage of the telemetry data among the memory associated with the basic input/output system.

9. An article of manufacture comprising:
   a non-transitory computer-readable medium; and
   computer-executable instructions carried on the non-transitory computer-readable medium, the instructions readable by a processing device, the instructions, when read and executed, for causing the processing device to, in a basic input/output system configured to identify, test, and/or initialize information handling resources of an information handling system;
   predict a volume of incoming telemetry data collected by a preboot driver of the basic input/output system; and
   based on the volume predicted, manage storage of the telemetry data among memory associated with the basic input/output system;
   predict a consumption of the telemetry data by an operating system of the information handling system; and
   selectively enable and disable communication of the telemetry data to the operating system based on the consumption predicted.

10. The article of claim 9, wherein the memory associated with the basic input/output system includes persistent memory, volatile memory, and a storage partition.

11. The article of claim 10, wherein managing storage of the telemetry data among memory associated with the basic input/output system includes managing offload of telemetry data.

12. The article of claim 9, the instructions for further causing the processing device to:
   determine a consumption of the telemetry data by an operating system of the information handling system; and
   based on the volume predicted and the consumption, manage storage of the telemetry data among the memory associated with the basic input/output system.

* * * * *